United States Patent [19]
Demke et al.

[11] Patent Number: 6,021,276
[45] Date of Patent: Feb. 1, 2000

[54] METHOD AND APPARATUS FOR MICROCODE DOWNLOADING

[75] Inventors: Kent Ray Demke, Pflugerville; Randy M Ortiz, Austin, both of Tex.

[73] Assignee: International Business Machines Corporation, Armonk, N.Y.

[21] Appl. No.: 09/038,030

[22] Filed: Mar. 11, 1998

[51] Int. Cl.[7] .................................................. G06F 9/445
[52] U.S. Cl. ........................................................ 395/712
[58] Field of Search .................................... 395/712, 708, 395/703

[56] References Cited

U.S. PATENT DOCUMENTS

| | | | |
|---|---|---|---|
| 5,305,457 | 4/1994 | Takida et al. .............................. | 710/1 |
| 5,432,939 | 7/1995 | Blackledge, Jr. et al. .......... | 364/DIG. 1 |
| 5,577,244 | 11/1996 | Killebrew et al. ....................... | 395/703 |
| 5,671,356 | 9/1997 | Wang .................................. | 395/200.52 |
| 5,687,073 | 11/1997 | Kishimoto ............................... | 364/131 |
| 5,715,463 | 2/1998 | Merkin .................................... | 395/712 |
| 5,764,992 | 6/1995 | Kullick et al. ........................... | 395/712 |
| 5,781,755 | 1/1997 | Uchino ........................................... | 1/1 |
| 5,832,496 | 11/1998 | Anand et al. ............................ | 707/102 |
| 5,870,610 | 6/1996 | Beyda ..................................... | 395/712 |

OTHER PUBLICATIONS

Journal : PC Computing, Nov., 1992, V6 n 11, Title: A directory of Windows 3.1 files.

Journal: Computer Select, Nov., 1993, Title: The essential all–in–one handbook for windows 3.1.

Accession No.: 1997 (35):6407 Compendex, Title: Verification methodology of compatible microprecessors, author: Yim, Joon–Seo, Source: Preceedings of the Asia and South Pacific Design At.

"Your Next OS Compatibility Compared", written by Cox et al, published at PC Magazine, Sep. 26, 1995.

In the year 1995 (network printing with Windows 95 (include related buyers' guide of print servers), written Gott, Bill, LAN Magazine, Jun. 1995.

*Primary Examiner*—Tanq R. Hafiz
*Assistant Examiner*—Chameli C. Das
*Attorney, Agent, or Firm*—Robert V. Wilder; Volel Emile

[57] ABSTRACT

A method and implementing system are provided in which the download program is designed to execute either from a command line in a main menu or from a diagnostics or service menu 201 as a service aid. The drive program 203 loads an executable file 205 which first reads from a drive specific data ("DSDATA") file 207. This allows the executable file 205 to configure itself to correctly perform microcode download on a specific and designated drive device. The executable file program then proceeds to download the data contained in the drive binary firmware file 208 to a designated drive write buffer 209. The program then prompts the operator for final confirmation that the drive should be updated. Once the operator confirms the download, the executable file program issues the command to load the firmware into the drive.

24 Claims, 7 Drawing Sheets

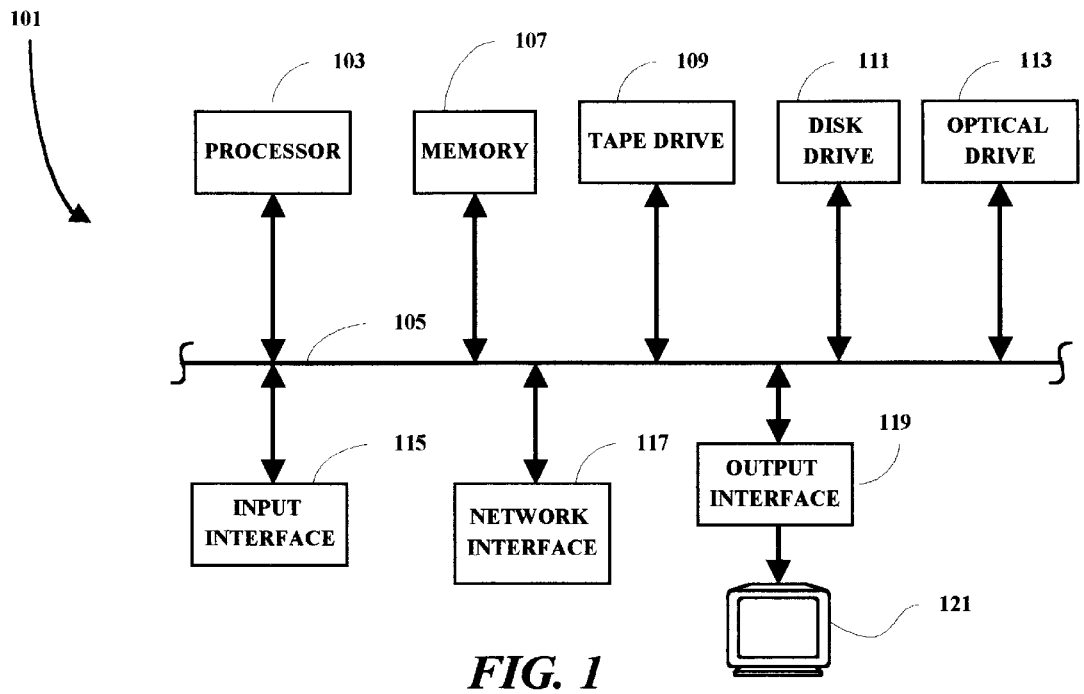
FIG. 1
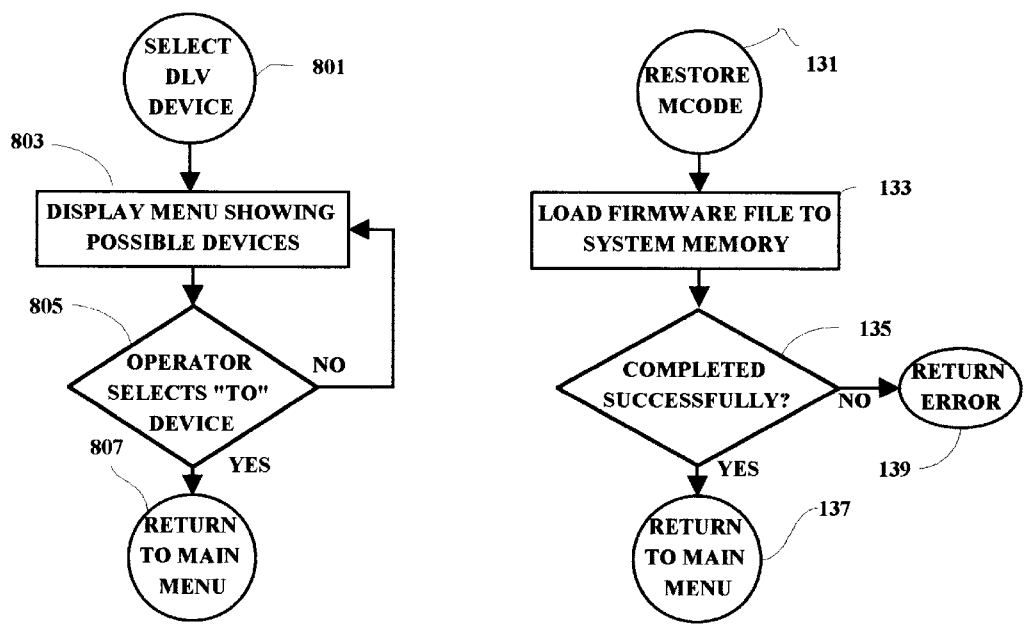
FIG. 8  FIG. 10

METHOD AND APPARATUS FOR MICROCODE DOWNLOADING

FIELD OF THE INVENTION

The present invention relates generally to information processing systems and more particularly to an improved methodology for accessing and retrieving micro-code.

BACKGROUND OF THE INVENTION

As computer systems and networked computer systems proliferate, and become integrated into more and more information processing systems, there is a growing need to make available and distribute micro-code relating to various devices within computer systems and devices. For example, device or system upgrades need to be made available for individual users so that the user is kept current with system or device improvements. Also, with the growing complexity of computer systems and related and/or peripheral devices, there is a need to be able to provide device or system related code to users which may include, for example, updated versions, improvements or corrections to earlier versions of the code.

Many of the storage devices used in computer systems support the capability to accomplish micro-code download over the SCSI bus. However, due to differences in implementation among various vendors, the download has always required a specific micro-code download program for each device. This has resulted in either a new program being added, usually to a diagnostic program, or at least a modification of an existing program to include the uniqueness for new drives. Moreover, whenever an existing diagnostic program has to be modified to include code for a new drive, a significant resource is required to write and test the change. Such resources are not always available on the release schedule for the new drive.

Accordingly, there is a need for an improved method and processing apparatus which is effective to facilitate the downloading of micro-code for computer system peripherals and related devices.

SUMMARY OF THE INVENTION

A method and apparatus is provided for downloading micro-code for installation in computer system drive devices or other programmable electronic devices. A main program is selectively operable for accomplishing the necessary interfacing and set-up procedures in the user system. An executable file effects the presentation of a series of displays which prompt the user to designate a specific system "source" device to be accessed for delivery of a new binary file. The user also selects the "target" device which is to be upgraded with the new binary file. The drive specific data file is read from the designated system source device and the executable file configures itself to accomplish the download from the source device. The new code is loaded from the designated source device into a buffer associated with the target device. The existing target code and the new binary file are compared and displayed to the user. The user is then prompted to complete the loading of the new code into the selected target device or other programmable device in the system.

BRIEF DESCRIPTION OF THE DRAWINGS

A better understanding of the present invention can be obtained when the following detailed description of a preferred embodiment is considered in conjunction with the following drawings, in which:

FIG. 1 is a block diagram of an exemplary computer system;

FIG. 8 is a flow chart illustrating another subroutine as implemented in an exemplary embodiment of the disclosed methodology;

FIG. 10 is a flow chart illustrating another subroutine as implemented in an exemplary embodiment of the disclosed methodology.

DETAILED DESCRIPTION

Figure 2:
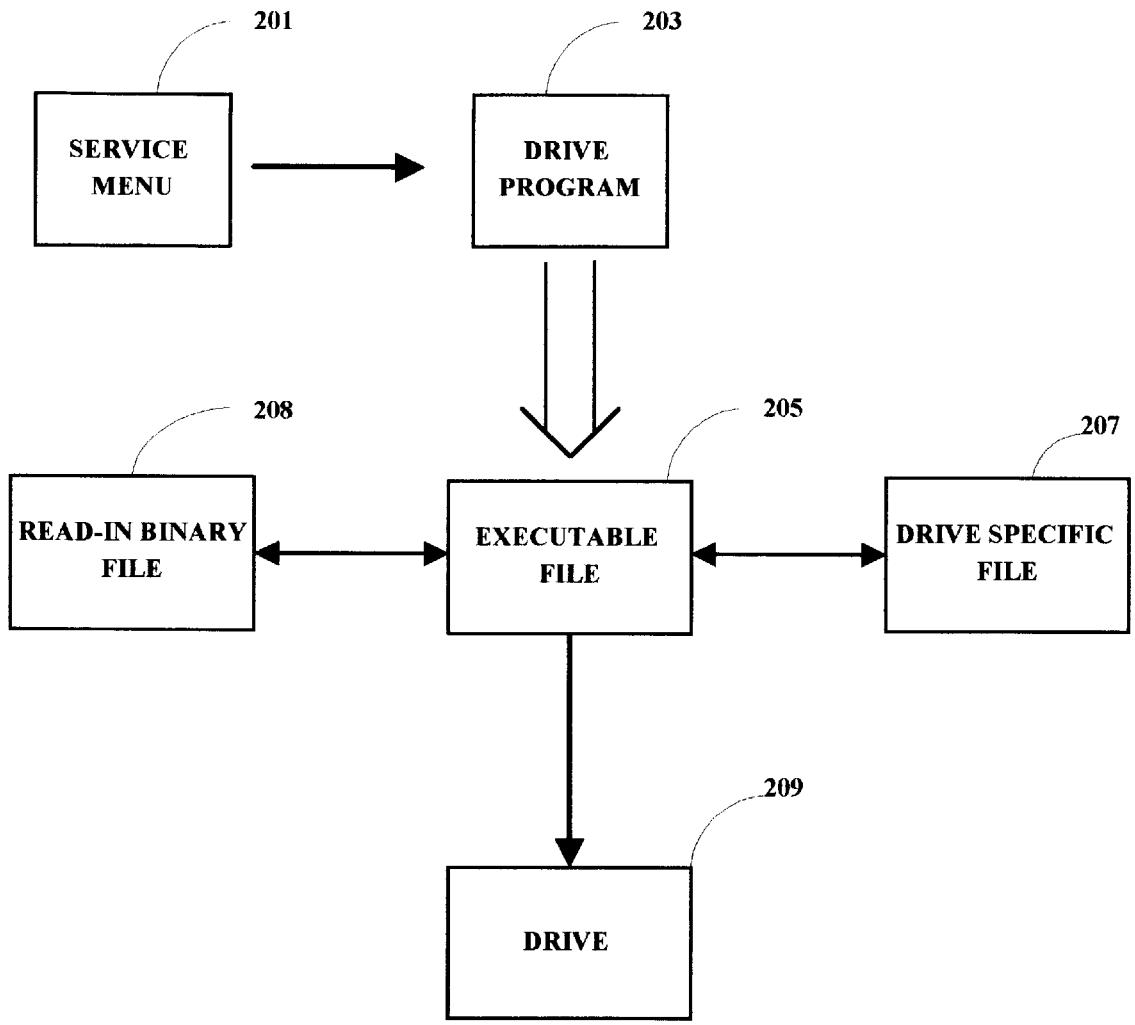
FIG. 2 is a flow chart helpful in explaining an exemplary operational sequence of the present invention.

With reference to FIG. 1, the various methods discussed herein may be implemented within a typical computer system or workstation 101. An exemplary hardware configuration of a workstation which may be used in conjunction with the present invention is illustrated and includes a processor unit 103, such as a conventional microprocessor, and a number of other units interconnected through a system bus 105, which may be any host system bus. It is noted that the processing methodology disclosed herein will apply to many different bus and/or network configurations. The bus 105 may include an extension for further connections to other busses, workstations or networks, other peripherals and the like. The workstation shown in FIG. 1 includes system memory 107, and several storage devices including a tape drive 109, a disk drive 111 and an optical drive unit 113.

The system bus 105 is also typically connected through a user or input interface 115 to which may be connected user input devices such as a keyboard device and/or a mouse or other pointing device. Other user interface devices may also be coupled to the system bus 105 through the user interface 115. An implementing system may also include a network interface 117 for connection to one or more networks. The system illustrated also includes an output interface 119 which couples the bus 105 to a display device 121. Magnetic media or other media containing programming indicia may also be read into system memory from one or more of the drive devices 109, 111 or 113, and may also be coupled into system memory through the network interface 117.

The methodology disclosed herein may be implemented partially in software and partially in hardware with the software residing in system storage or loaded into system memory or separate memory elsewhere in the system. Since the workstation or computer system 101 within which the present invention is implemented is, for the most part, generally known in the art and composed of electronic components and circuits which are also generally known to those skilled in the art, circuit details beyond those shown in FIG. 1, will not be explained to any greater extent than that considered necessary as illustrated above, for the understanding and appreciation of the underlying concepts of the present invention and in order not to obfuscate or distract from the teachings of the present invention.

In accordance with the present invention, an architecture is defined that allows a generic program to handle micro-code download for programmable devices such as all of the drives which may be present in a computer system. This can be released as a stand-alone program without requiring the continual changes that are currently needed when new drives are installed in a system. The program can be easily distributed to drive and system customers via diskette, tape, CD-ROM or from the internet or other network access. The architecture works by converting a generic download program into a "drive specific" program by passing all specific parameters at the time of download execution. This is accomplished by defining three files in an exemplary embodiment. The three files include: a micro-code download program or executable file; a drive specific file; and the hex-data or binary firmware file.

With reference to FIG. 2, the download program is designed to execute either from a command line in a main menu or from a diagnostics or service menu 201 as a service aid. The drive program 203 loads an executable file 205 which first reads from a drive specific data ("DSDATA") file 207. This allows the executable file 205 to configure itself to correctly perform micro-code download on a specific and designated programmable drive device. The executable file program then proceeds to download the data contained in the drive binary firmware file 208 to the designated drive write buffer 209. The program then prompts the operator for final confirmation that the drive should be updated. Once the operator confirms the download, the executable file program issues the command to load the firmware into the programmable drive device.

The drive specific file DSDATA contains all of the specific parameters that are required to successfully download to a given drive. That data is typically in ASCII format for easy editing. The DSDATA file is stored as a separate file along with the executable file and the drive binary firmware file. As the executable file operates, it pulls in all of the ASCII fields in the DSDATA file and uses the fields to self-configure to the designated drive. In a specific example, the data that may be stored in the DSDATA file may include, inter alia, the following: the binary file name; format; block size; buffer offset; binary file size; "timeout" value; write buffer type; vendor name; page offset; field length; firmware level; page offset; and byte length hex value. The firmware file will, for example, contain the new or upgraded code, which will be loaded into the designated drive.

Figure 3:
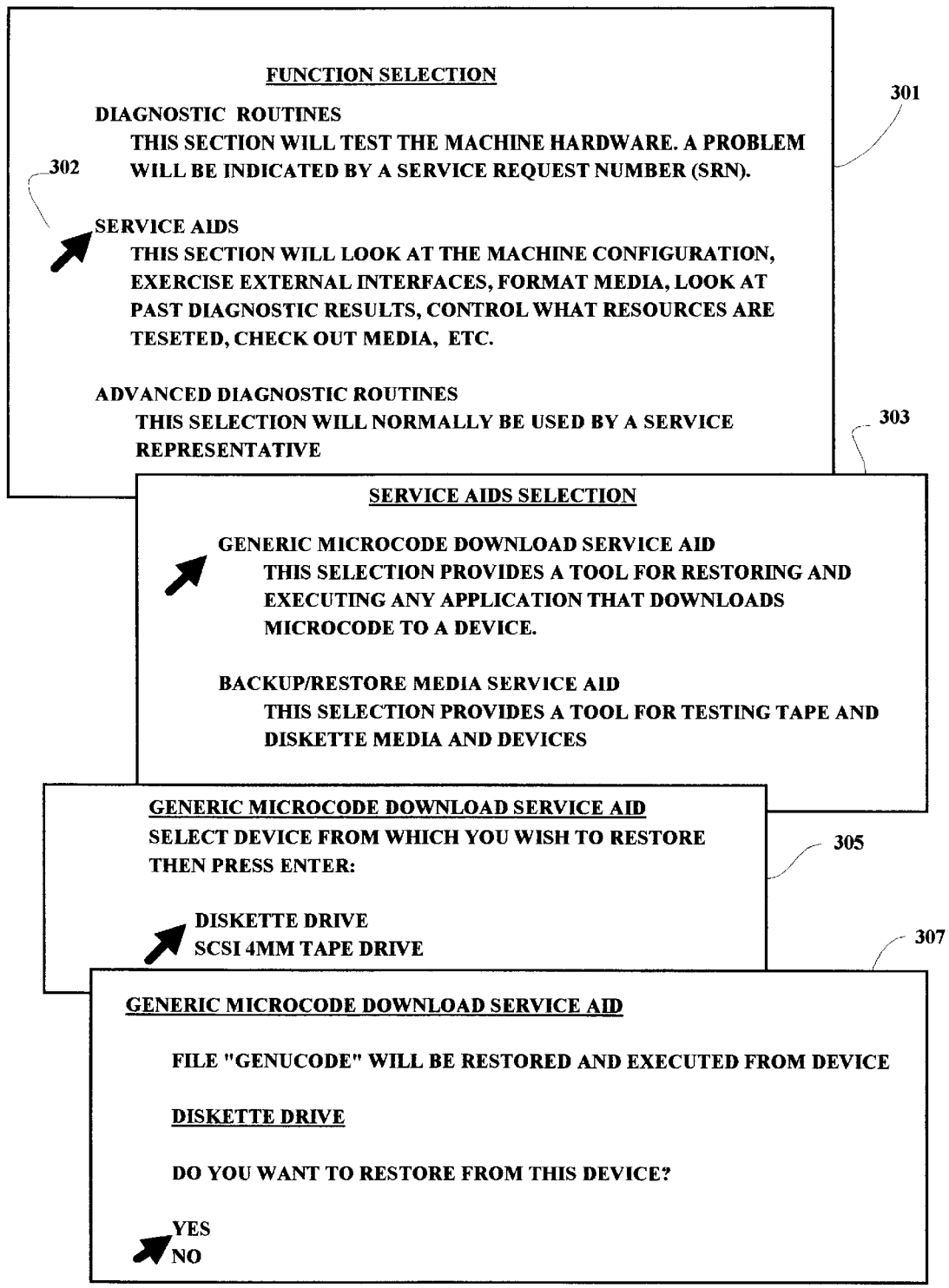
FIG. 3 is an illustration of several exemplary display screens which may be implemented in connection with the present invention.
Figure 4:
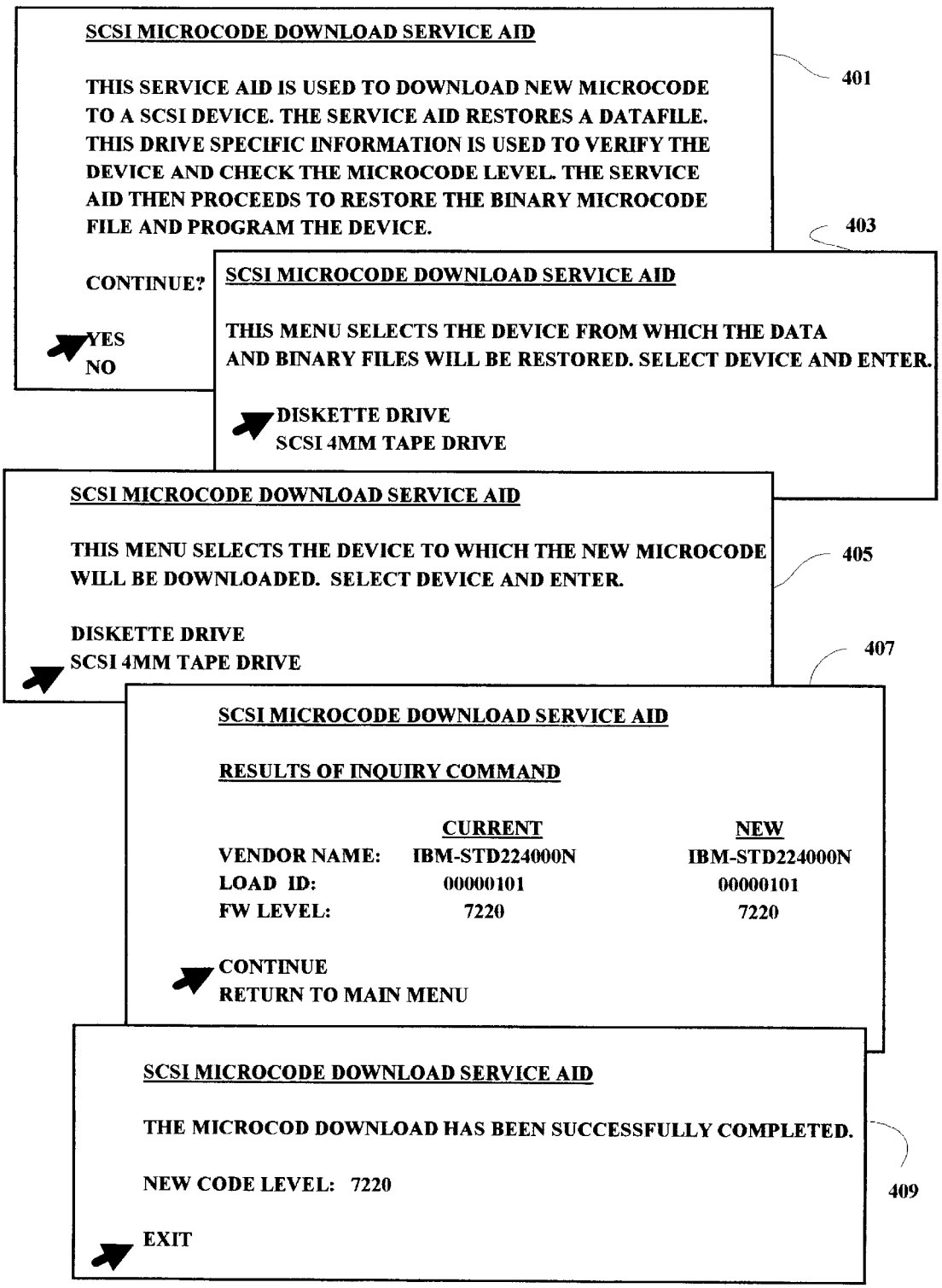
FIG. 4 is another illustration of several exemplary display screens which may be implemented in connection with the present invention.

FIG. 3 and FIG. 4 illustrate several screens which may be created and displayed to a user during a download session. The screens illustrated in FIG. 3 may be generated from the drive program which may be resident in a diagnostics routine in the user system. That drive program will allow a user to designate a source from which one or more of three basic files are transferred to the user system. That source may be a remote system or device which is accessible over a network or the source may be a diskette drive present in the user's system. In the illustrated example, it is assumed that the three files are present on a diskette which is loaded in a user's system. The diskette in the present example contains a drive specific data file, an executable file and a binary drive or firmware file. The FIG. 4 screens may, for example, be generated by the executable file which was loaded from the diskette in the diskette drive. The exemplary screens may be either full screen presentations or window-like sequential presentations and screen options may be selected in any one of many manners including by moving a cursor to a position and hitting the "Enter" key or by moving a pointer to a position on a screen and "clicking" one of the switches on a mouse or other pointing device. In the examples illustrated, a pointer 302 is used to indicate a user selection. In FIG. 3, a "Function Selection" screen 301 is initially displayed. That screen may be part of a diagnostics program or it may be a separate stand-alone program for initiating a code download for a system drive device.

The function selections may include, for example, a selection designated "Service Aids", which is operable to look at the user system configuration, past results and resources available. The selection of the "Service Aids" will, for example, effect the presentation of another screen or display 303 which will provide a user with a choice of one of a plurality of service aids, including a generic micro-code download service aid for restoring and executing an application that downloads micro-code from a remote location for example, to a device in the user's system. That selection will cause a presentation of another screen 305 which will prompt a user to select a device from which the user desires to restore or update a selected drive device in the system. In the example, it is assumed that a user has the download program (executable file program 205) in diskette form and the diskette is loaded in a diskette drive (i.e. a "source" device), and that the user wishes to update or restore a SCSI (small computer system interface) 4 mm tape drive (i.e. a "target" device) in the user's system. The user then chooses or "points to" the "Diskette Drive" selection and clicks on the pointer device or "enters" the selection. Next in the illustrated example, a screen is presented which prompts the user to confirm his selection of the diskette drive as the "from" or "source" device. After confirming the selection of the diskette drive as the "source" device, the user is presented with a screen 401 as illustrated in FIG. 4. It should be noted that the illustrated screens are only exemplary, and the particular design of the screens and even the inclusion of all of the screen or processing functions illustrated may not be necessary in implementing a particular system to take advantage of the benefits of the methodology disclosed herein.

Referring to FIG. 4, screen 401 presents to a user a summary of the download function selected by the user to allow the user to either continue or exit the program. If the user continues, the next screen 403 allows the user to select the device from which the data and binary files will be restored. In the example, the diskette drive is again selected and the next screen 405 prompts the user to choose the device "to which" the new micro-code will be downloaded (i.e. a "target" device). In the example, the user selects the SCSI 4 mm tape drive and the next screen 407 displays the current user system specification with the new code or update. If the new code is not a more recent version for example, a "Warning" may be displayed advising that the user is attempting to install the same or a down-level code for the selected drive. Alternatively, the program may be designed not to allow the user to download the same or a down-level version of the micro-code. If the new code to be downloaded is a newer version that the code currently on the user system device being updated, the user will "continue" with the download, and after the download has been completed, the user will be advised by screen 409 that the new code has successfully been downloaded and, for example, the new code version number may be displayed. The user may then exit the program having successfully updated the firmware for the selected 4 mm tape drive which is the "target" device in the present example.

Figures 5, 11:
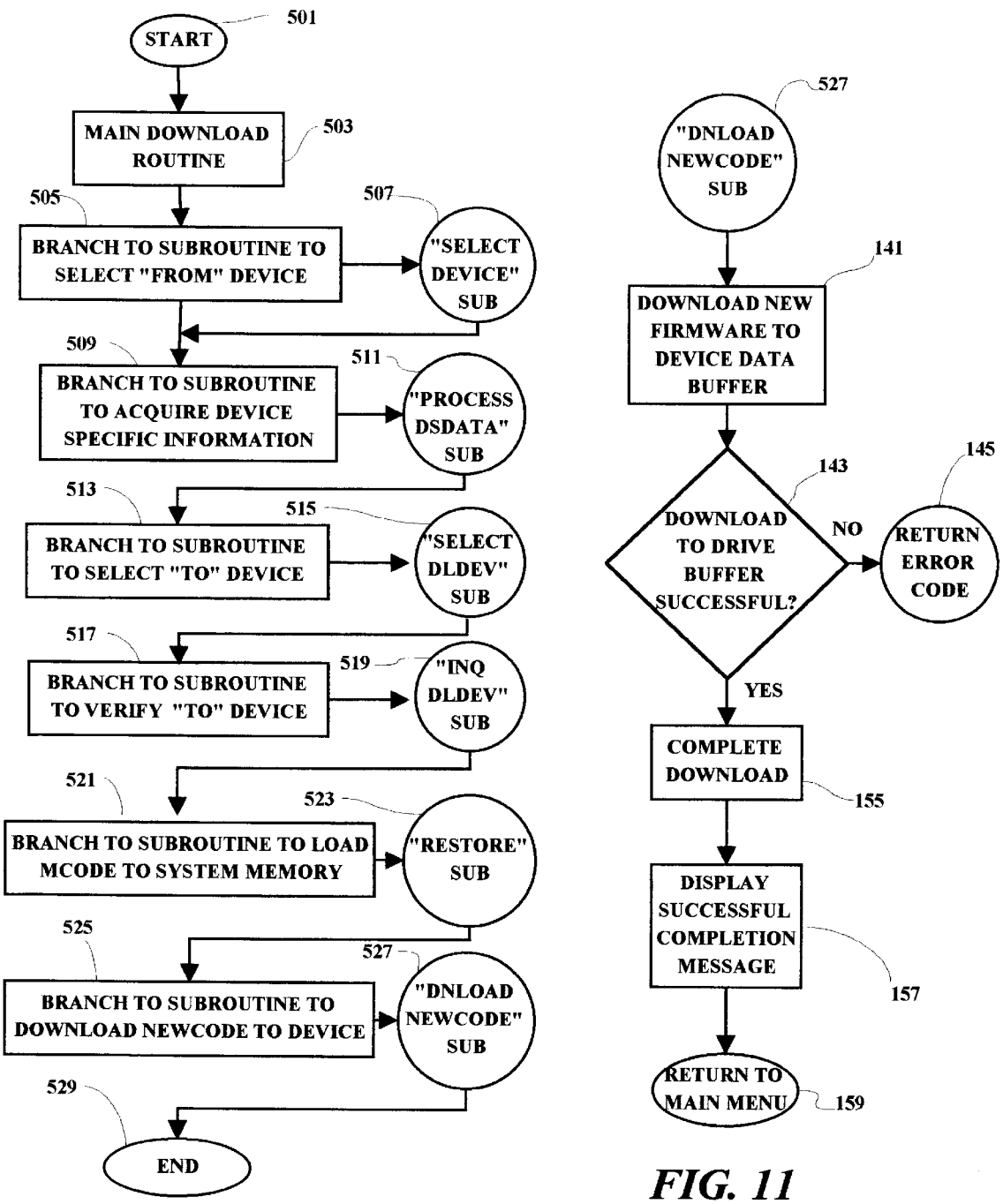
FIG. 5 is a flow chart used in explaining a typical operational sequence in one implementation of the present invention.
FIG. 11 is a flow chart illustrating another subroutine as implemented in an exemplary embodiment of the disclosed methodology.

Referring to FIG. 5, an exemplary flow chart for the main operational flow sequence is shown. When the program is started 501 a main download routine is called 503 and a series of "branch to" statements 505, 509, 513, 517, 521 and 525 are issued. A screen is displayed 507 to allow the user to select the "from" device as hereinbefore explained. A user may select the "from" device from which the program will run in which case the "Select Device" subroutine 507 will run and the program will then acquire device specific information 509 and execute a "PROCESS DSDATA" 511 subroutine. Next, the screen is presented by which the user may select the "to" device as hereinbefore explained. Next, the subroutine "DLDEV" is executed 515 and the verification screen is presented to allow the user to verify 519 the "to" device, i.e. the tape drive in the example. Next the "branch to load MCODE to system memory" is executed and the program branches 521 to a "RESTORE" subroutine 523 to load the new micro-code to the user system memory. Next the program branches 525 to a "download new code" subroutine DNLOAD NEWCODE 527 to download the new operating code to the selected tape drive device and the process is ended 529.

Figure 6:
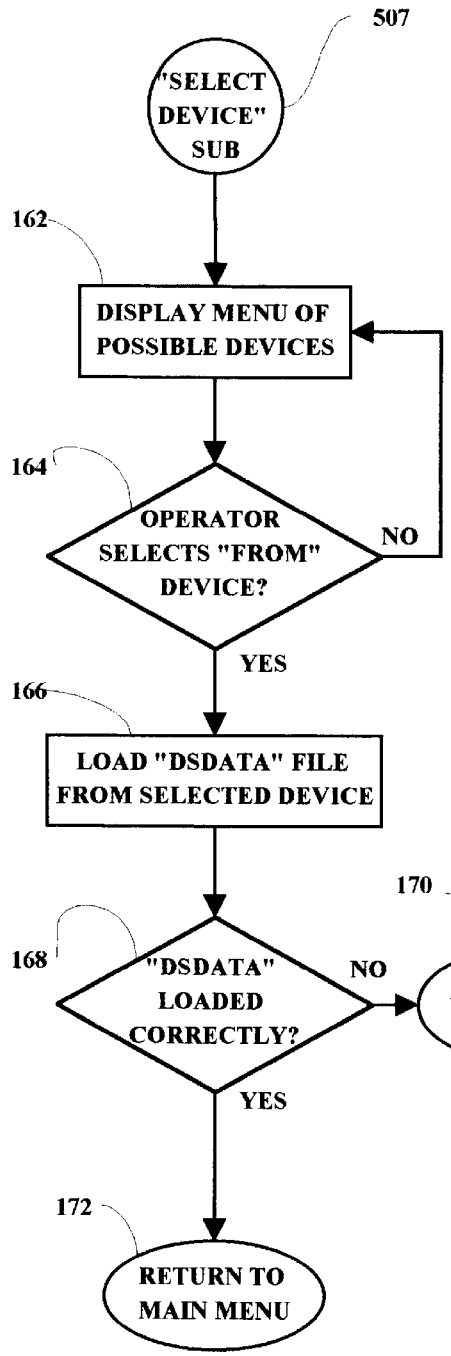
FIG. 6 is a flow chart illustrating a subroutine as implemented in an exemplary embodiment of the disclosed methodology.

Referring to FIG. 6, when the "Select Device" subroutine is called 507, a menu of possible devices is displayed 162, from which an operator or user may make a selection and the selected device data file is loaded 166. A check is made to determine if the data file has been loaded correctly 168. If the data file has not been loaded correctly, a failure code is returned 170, otherwise the program returns 172 to the main menu.

Figure 7:
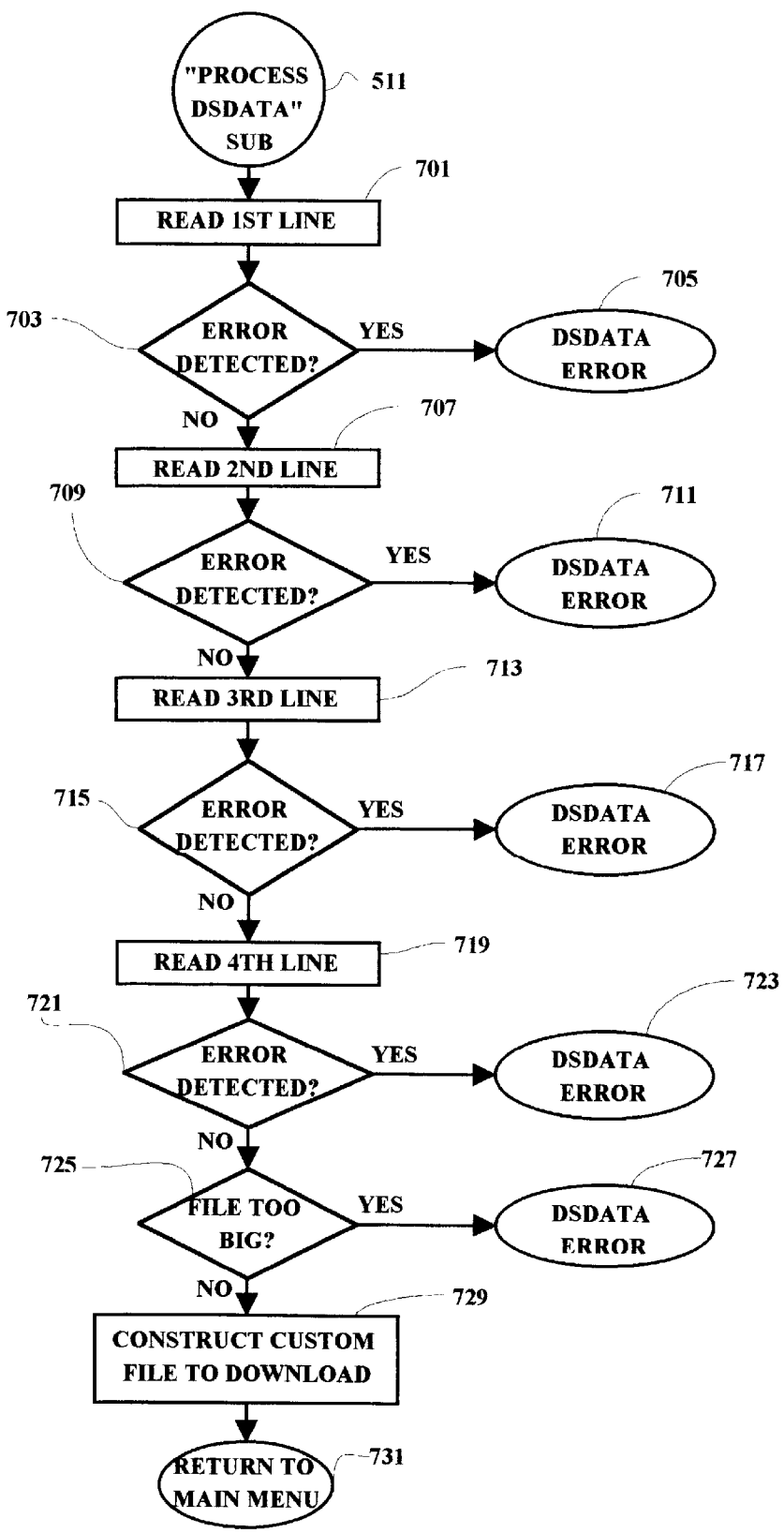
FIG. 7 is a flow chart illustrating another subroutine as implemented in an exemplary embodiment of the disclosed methodology.

In FIG. 7, the "PROCESS DSDATA" subroutine 511 will read the first line of data 701 and check that line for errors 703. In the present example, there are four lines of data although any number of lines may be implemented in a particular application. Each line of data is sequentially read 701, 707, 713 and 719, and checked for errors 703, 709, 715, 721, respectively, and if errors are detected, corresponding "data error" displays are presented, 705, 711, 717, 723, respectively. In addition, a check is made to determine if the file is too big 725. If the file is too long, a corresponding data error display is presented 727; otherwise, a custom download file is constructed 729 based on the particular data of the selected device from which the download is to be conducted. Thereafter, the program again returns to the main menu 731.

FIG. 8 illustrates the subroutine "DLV DEVICE" 515 which, when initiated 801 will effect a display 803 of the possible devices in the user system. When the user or operator selects 805 the "to" device to which the new code is to be transferred, the program returns 807 to the appropriate screen in the main menu sequence.

Figure 9:
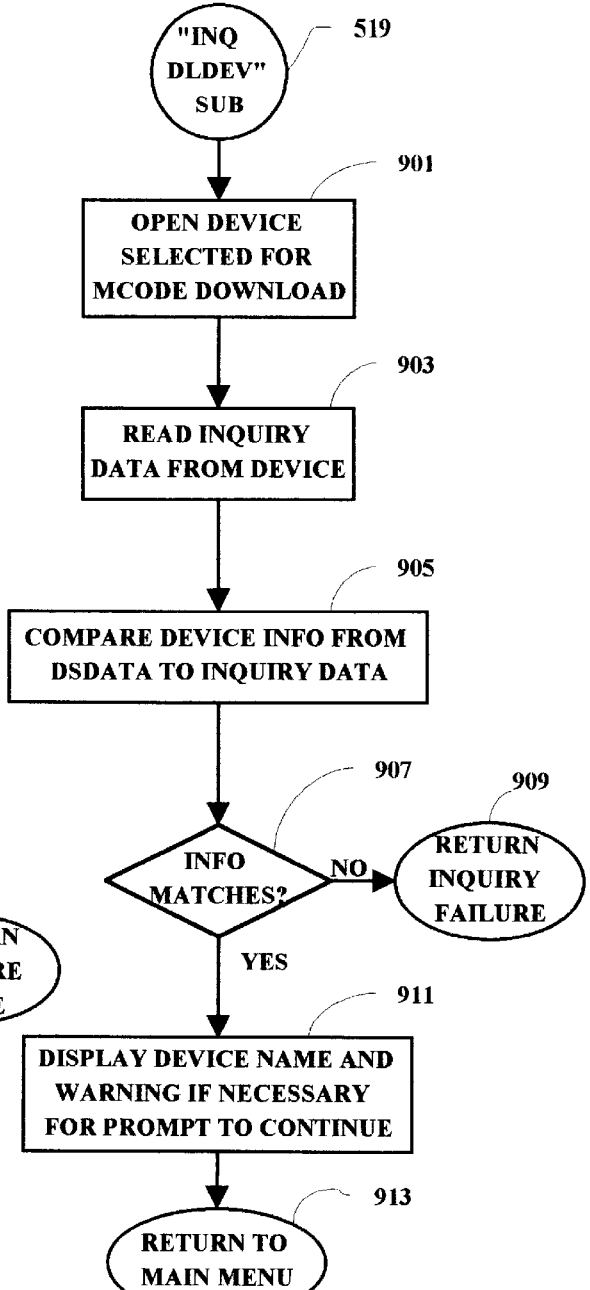
FIG. 9 is a flow chart illustrating another subroutine as implemented in an exemplary embodiment of the disclosed methodology.

In FIG. 9, when the INQDLDEV subroutine 519 is called, the device to which the micro-code is to be transferred is opened 901 and the inquiry data from the device selected is read 903 and compared 905 with the device specific data file DSDATA. If the information matches, i.e. if the inquiry data from the drive matches 907 the drive specific data for the device to which the new code is to be downloaded, then the device name, i.e. the tape drive in the present example, is displayed 911 for operator confirmation 407 and the program returns to the main menu 913. If the information does not match, or if the user does not choose to continue if there is a warning, then an appropriate message is displayed and an inquiry failure is returned 909. Also, one of the parameters read from the drive specific file 207 is the formal file name for the read-in binary file 208. If that file name does not match the file name for the binary file 208, then an error message is displayed.

In FIG. 10, when the RESTORE MCODE subroutine is called 131, the firmware file is loaded 133 from the diskette to the system memory and a check is made 135 to determine if the firmware was loaded correctly. If so, the program returns to the main menu routine 137. If the micro-code was not loaded correctly, an error message is returned 139. The program may also implement one or more retries before returning the error message.

Referring to FIG. 11, the subroutine for downloading the new code is shown. When the DNLOAD NEWCODE subroutine is called 527, the new firmware is downloaded 141 to the selected "to" device data buffer which is to be updated. A check is then made 143 to determine that the data buffer download was performed successfully. If successful, the final download is completed 155 to the drive's memory, which is a "flash" memory in the present example. A screen is then displayed advising of a successful download 157 and the program returns to the main menu routine.

In an alternate embodiment, the DSDATA file 207 is a universal file which includes the parameters from several devices or device types. When the user is prompted to identify the target device to which the binary file is to be transferred 405, the executable file 205 would match the target device with the appropriate parameters in the drive specific file 207 from the listing of several devices' parameters. The remainder of the operation would be as hereinbefore described. The disclosed methodology may be implemented through a local network or through a larger network, such as the Internet, where all or portions of the the DSDATA file, the executable file and/or the binary file are located at a site remote from the user terminal.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The methodology may also be implemented solely in program code stored on a CD, disk or diskette (portable or fixed), or other memory or storage device, from which it may be executed to function as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for loading micro-code into a programmable target device to update said target device in a user system, said method comprising:

presenting a source selection screen on a display device to prompt a user to identify a selected source device;

acquiring a drive specific data file corresponding to said selected source device after selection by said user;

accessing an executable file;

running said executable file, said executable file being operable to read said drive specific data file, said executable file being operable to configure itself in accordance with said drive specific data file to perform a download of said micro-code;

presenting a target selection screen on said display device to prompt said user to identify said selected target device to be updated;

downloading a micro-code update file for said selected target device to a buffer device associated with said selected target device;

presenting an update confirmation screen to said user to prompt said user to confirm an updating of said micro-code in said target device with said micro-code in said buffer device, said update confirmation screen including version information related to both micro-code currently residing in said target device and micro-code in said buffer device associated with said target device; and loading said micro-code update file into said target device to update said target device after said user has confirmed said updating.

2. The method as set forth in claim 1 wherein said selected source device is a diskette drive, said executable file being loaded on a diskette, said diskette being selectively engageable within said diskette drive.

3. The method as set forth in claim 2 wherein said selected source device is accessible through a network coupling from said user system.

4. The method as set forth in claim 1 wherein said selected source device is accessible through a network coupling from said user system.

5. The method as set forth in claim 1 wherein said micro-code update file is loaded on a diskette, said diskette being selectively engageable within a diskette drive in said user system.

6. The method as set forth in claim 1 wherein said micro-code update file is accessible through a network coupling from said user system.

7. The method as set forth in claim 1 wherein both said executable file and said micro-code update file are accessible from a single diskette drive.

8. The method as set forth in claim 7 wherein said single diskette drive is accessible through a network coupling from said user system.

9. The method as set forth in claim 1 wherein both said executable file and said micro-code update file are in memory accessible through a network coupling from said user system.

10. The method as set forth in claim 1 wherein said target device is a drive device within said user system.

11. The method as set forth in claim 10 wherein said drive device is a tape drive device.

12. A storage medium including machine readable indicia, said storage medium being selectively coupled to a reading device, said reading device being selectively coupled to processing circuitry within a user system, said reading device being selectively operable to read said machine readable indicia and provide program signals representative thereof, said program signals being selectively operable for effecting a loading of micro-code into a programmable target device to update said target device in a user system by performing the steps of:

presenting a source selection screen on a display device to prompt a user to identify a selected source device;

acquiring a drive specific data file corresponding to said selected source device after selection by said user;

accessing an executable file;

running said executable file, said executable file being operable to read said drive specific data file, said executable file being operable to configure itself in accordance with said drive specific data file to perform a download of said micro-code;

presenting a target selection screen on said display device to prompt said user to identify said selected target device to be updated;

downloading a micro-code update file for said selected target device to a buffer device associated with said selected target device;

presenting an update confirmation screen to said user to prompt said user to confirm an updating of said micro-code in said target device with said micro-code in said buffer device, said update confirmation screen including version information related to both micro-code currently residing in said target device and micro-code in said buffer device associated with said target device; and loading said micro-code update file into said target device to update said target device after said user has confirmed said updating.

13. The storage medium as set forth in claim 12 wherein said selected source device is a diskette drive, said executable file being loaded on a diskette, said diskette being selectively engageable within said diskette drive.

14. The storage medium as set forth in claim 13 wherein said selected source device is accessible through a network coupling from said user system.

15. The storage medium as set forth in claim 12 wherein said selected source device is accessible through a network coupling from said user system.

16. The storage medium as set forth in claim 12 wherein said micro-code update file is loaded on a diskette, said diskette being selectively engageable within a diskette drive in said user system.

17. The storage medium as set forth in claim 12 wherein said micro-code update file is accessible through a network coupling from said user system.

18. The storage medium as set forth in claim 12 wherein both said executable file and said micro-code update file are accessible from a single diskette drive.

19. The storage medium as set forth in claim 18 wherein said single diskette drive is accessible through a network coupling from said user system.

20. The storage medium as set forth in claim 12 wherein said both said executable file and said micro-code update file are in memory accessible through a network coupling from said user system.

21. The storage medium as set forth in claim 12 wherein said target device is a drive device within said user system.

22. The storage medium as set forth in claim 21 wherein said drive device is a tape drive device.

23. The storage medium as set forth in claim 12 wherein said program signals are further effective for causing a warning message to the user if the micro-code to be loaded to said target device is not a newer version of micro-code, said user being enabled to make a screen selection to exit from loading said micro-code.

24. A computer system comprising:

input means arranged for receiving input from a user and providing input signals;

display terminal means arranged for connection to a display device; and processing means coupled to said input means and said display terminal means, said processing means being responsive to said input signals for:

presenting a source selection screen on the display device to prompt the user to identify a selected source device from which a target device in said user system is to be updated;

acquiring a drive specific data file corresponding to said selected source device after selection by said user;

accessing an executable file;

running said executable file, said executable file being operable to read said drive specific data file, said executable file being operable to configure itself in accordance with said drive specific data file to perform a download of said micro-code;

presenting a target selection screen on said display device to prompt said user to identify said selected target device to be updated;

downloading a micro-code update file for said selected target device to a buffer device associated with said selected target device;

presenting an update confirmation screen to said user to prompt said user to confirm an updating of said micro-code in said target device with said micro-code in said buffer device, said update confirmation screen including version information related to both micro-code currently residing in said target device and micro-code in said buffer device associated with said target device; and loading said micro-code update file into said target device to update said target device after said user has confirmed said updating.

* * * * *